US010379750B2

(12) United States Patent
Schreter

(10) Patent No.: US 10,379,750 B2
(45) Date of Patent: Aug. 13, 2019

(54) PROCESSING LARGE REQUESTS IN DATA STORAGE SYSTEMS WITH LIMITED/CONSTANT BUFFER SIZES

(71) Applicant: SAP SE, Walldorf (DE)

(72) Inventor: Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/601,986

(22) Filed: May 22, 2017

(65) Prior Publication Data

US 2018/0335955 A1 Nov. 22, 2018

(51) Int. Cl.
*G06F 3/06* (2006.01)
*G06F 13/16* (2006.01)

(52) U.S. Cl.
CPC ............ *G06F 3/0611* (2013.01); *G06F 3/067* (2013.01); *G06F 3/0656* (2013.01); *G06F 13/1642* (2013.01); *G06F 13/1673* (2013.01)

(58) Field of Classification Search
CPC . H04L 47/2441; H04L 47/6215; H04L 47/60; H04L 49/351; H04L 12/44; H04L 49/90; H04L 49/3018; H04L 47/522; H04L 47/6255; H04L 47/50; H04L 49/3027; G06F 3/0659; G06F 5/06
USPC ........ 370/401, 235, 412, 429; 709/249, 232, 709/250; 710/5, 36, 39, 52, 54, 56
See application file for complete search history.

(56) References Cited

U.S. PATENT DOCUMENTS 6,098,110 A * 8/2000 Witkowski ............ H04L 49/351 370/412
6,504,846 B1 * 1/2003 Yu ........................... H04L 47/15 370/395.7
6,762,995 B1 * 7/2004 Drummond-Murray .................... H04L 47/10 370/229
7,937,482 B1 * 5/2011 Vermeulen .......... G06F 11/1425 709/229
2005/0055489 A1 * 3/2005 Elliott ..................... G06F 5/065 710/310
2006/0155729 A1 * 7/2006 Aahlad ..................... G06F 9/52
2007/0244938 A1 * 10/2007 Michael .............. G06F 11/1458
2009/0041054 A1 * 2/2009 Das ......................... H04L 49/90 370/469
2011/0055842 A1 * 3/2011 Fritz ....................... H04L 49/90 718/104
2013/0204965 A1 * 8/2013 Masputra ................ H04L 47/60 709/217

(Continued)

*Primary Examiner* — Faisal M Zaman
(74) *Attorney, Agent, or Firm* — Mintz Levin Cohn Ferris Glovsky and Popeo, P.C.

(57) ABSTRACT

An available receive slot of an incoming network queue can be allocated to a network packet of a request received at a computing node, and receipt of the network packet can be processed using the allocated receive slot. An available free I/O control block of a free I/O control block queue and an available request slot from a free request queue can be allocated to the network packet after completion of the receipt processing. The free I/O control block queue and free request queue respectively have a same number of I/O queue blocks and request slots as the incoming network queue has receive slots. An I/O task required for the network packet can be completed using the allocated I/O control block, and an available send slot of an outgoing network queue can be allocated to send a reply to a client machine from which the request was received.

25 Claims, 3 Drawing Sheets

(56) References Cited

U.S. PATENT DOCUMENTS

| | | | | |
|---|---|---|---|---|
| 2014/0189004 | A1* | 7/2014 | Aahlad | H04L 67/1048 709/204 |
| 2016/0094655 | A1* | 3/2016 | Don | G06F 17/30371 709/202 |
| 2017/0201590 | A1* | 7/2017 | Wojciechowski | H04L 67/1095 |
| 2017/0364285 | A1* | 12/2017 | Piduri | G06F 3/0619 |
| 2018/0335955 | A1* | 11/2018 | Schreter | G06F 3/0611 |

* cited by examiner

PROCESSING LARGE REQUESTS IN DATA STORAGE SYSTEMS WITH LIMITED/CONSTANT BUFFER SIZES

TECHNICAL FIELD

The subject matter described herein relates to distributed computing systems, and in various aspects to communication between computing nodes of such systems.

BACKGROUND

Computing nodes (also referred to herein simply as "nodes") of a distributed computing system communicate over a communication network. Such computing nodes can be computing systems that each include at least one programmable processor. A distributed system can, in a non-limiting example, be a plurality of computing nodes that implement a distributed data storage application or any other kind of application in which exchange of messages, data, or the like between nodes occurs to enable replication of a state machine of the application between a plurality of replicas such that the replicas remain synchronized with regard to processes being executed by the distributed computing system. A process as used herein refers generally to any kind of data processing, data storage, or other computer-implemented process. A communication network can include one or more of a wired network, a wireless network, a local area network, a wide area network, an organization's intranet, the Internet, or the like. Typically, nodes in a distributed system use consensus protocols to coordinate replication of data among replicas maintained on several computing nodes of the distributed computing system to enable continued operation in case of a failure of one or more of the computing nodes. Other computing nodes of a plurality of computing nodes besides a computing node being referenced are generally referred to as "peer computing nodes" or simply "peers" of the computing node.

SUMMARY

Aspects of the current subject matter can provide the ability to efficiently regulate data flow of incoming and outgoing network queues and an I/O queue for a computing node. In some aspects of the current subject matter, a set of queues each having a plurality blocks or slots can be used to facilitate orderly and even distributed processing a request received by a computing node. For example, a system may include one or more of an incoming network queue, a free I/O control block queue, a free request queue, and an outgoing network queue. The various queues can have a same (or optionally at least similar) number of blocks or slots allocated for processing of tasks, which can allow more even distribution of resources by making available a slot or block for a next processing task when a previous processing task is completed.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a data storage application, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Distributed computer systems typically use some kind of consensus protocol (for example, the Paxos protocol, the RAFT protocol, etc.) to achieve data replication and consistency across all replicas (e.g. of a data partition or some other state machine) in the system. A client machine generally connects to a currently-elected leader (e.g. a leader replica) of a plurality of replicas hosted across one or more computing nodes of the distributed system and sends one or more data requests to the leader replica. The leader replica then replicates mutate requests to other replicas in the cluster (i.e., all replicas except the leader replica itself) and ensures that a quorum is reached before replying to the client machine (i.e., a majority of the replicas including the leader replica have accepted the request).

Figure 1:
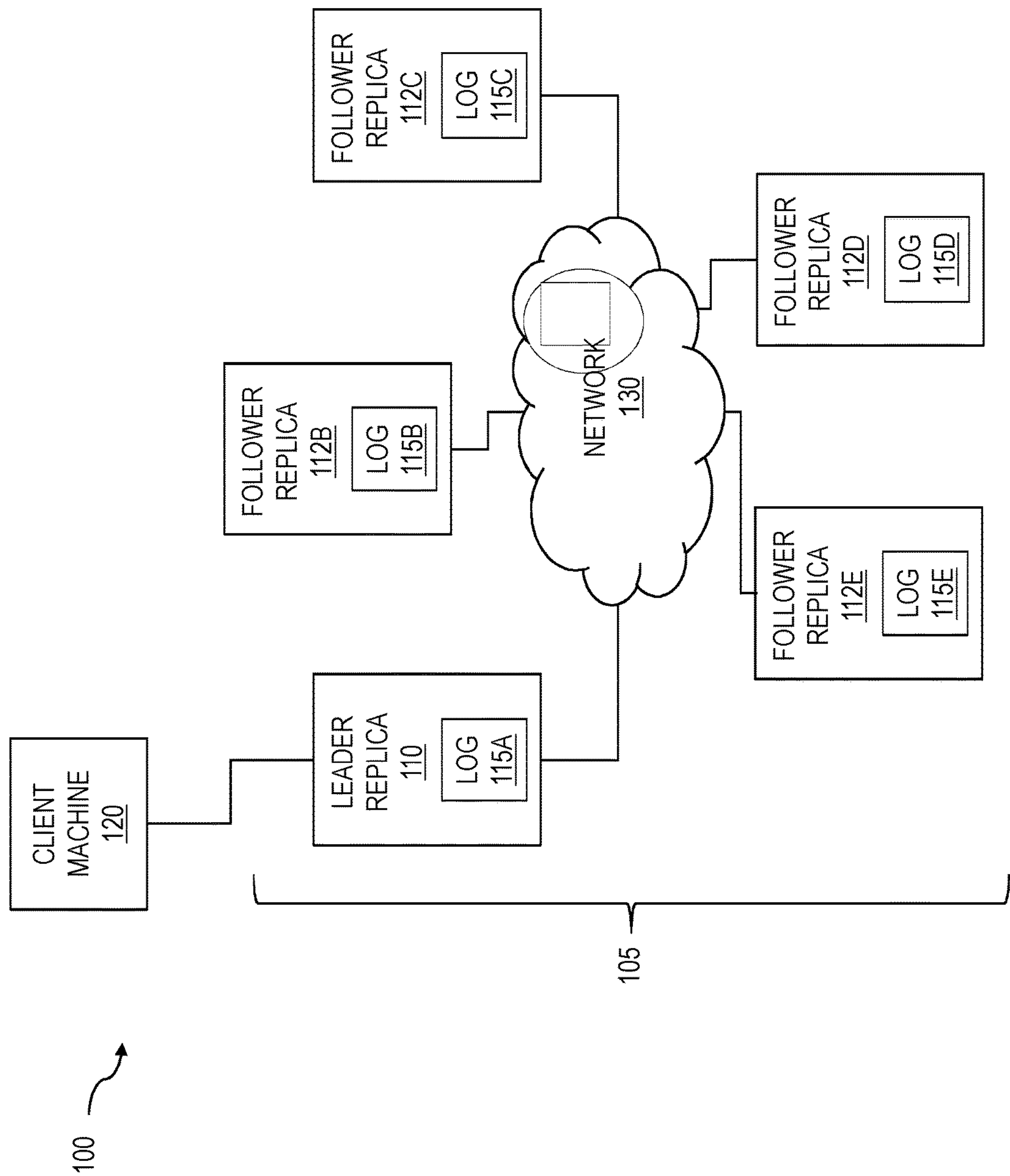
FIG. 1 shows a diagram illustrating aspects of a computing system arrangement having one or more features consistent with implementations of the current subject matter.

FIG. 1 shows a diagram of a system architecture 100 in which a consensus protocol is used in a cluster 105 of computing systems (e.g. nodes) to ensure that the replicas of a state machine of an application are kept in a consistent state based on a consensus among the nodes. The cluster 105 shown in FIG. 1 includes a first replica 110 and additional "follower replicas" 112B, 112C, 112D, 112E. Each replica includes a respective write-ahead log 115A, 115B, 115C, 115D, 115E. The cluster 105 can interact with one or more client machine(s) 120, for example over a network communication pathway 130 to receive and respond to requests, such as messages regarding new data values, updates to data values, deletion of values, etc. (which are generally referred to herein as data updates). A cluster may have a leader replica, which can be the replica in the cluster designated to receive client requests, which can occur in the form of data requests to mutate or otherwise change data stored by a data storage application or other requests that require some change in the state of the application. In some examples, any replica in the cluster 105 can act as the leader replica for a given request. In the example of FIG. 1, the first replica 110 acts as the leader replica. Follower replicas are collectively referred to herein as "follower replicas 112."

Typically, a distributed computing system may process fairly small requests (e.g., up to about 1 KB). However, sometimes large requests must be processed as well (e.g., several tens of KBs and more, possibly up to several hundred MBs, etc.). If a server is required to keep in-memory buffers for larger requests, then these buffers might starve out other requests coming in parallel or potentially cause the request to not be processed at all due to a memory shortage. Advantageously, the server would work with predefined memory pools for various types of operations and therefore not be dependent on dynamic memory allocation at all.

Implementations of the current subject matter relate to one or more techniques for handling large requests within a cluster 105 without requiring that all data in memory are buffered, but nevertheless achieving full throughput and additionally more "fairness" (e.g. more even allocation of system resources) to other requests. In an illustrative example, approaches consistent with the current subject matter are described herein for use with a key/value store, which in general supports two operation types: PUT(key, value) and GET(key)=>value. A K/V store can be seen as a generalized hash table. It will be understood that implementations of the current subject matter are also applicable to other computing application, and that the example provided here is not limiting except to the extent it is recited in the claims below.

A typical network transfers data between computing nodes in network packets (also referred to simply as "packets"), which are generally sized within a relatively small range (e.g., about 1500 bytes for standard Ethernet). A communication connection streaming data from one computing node to another (e.g., using TCP/IP protocol) packetizes data and sends the data as individual network packets over the network. These network packets are reassembled by the receiving computing node as a data stream and processed by the receiving computing node. When a large request is sent, it is typically sent as a header followed by data. For instance, a key/value PUT request would include information such as key, value size and various storage control settings in the header and the value(s) itself/themselves in the data part of the request.

A data storage system can be modeled using several queues, which can be set to fixed size. These queues include an incoming network queue, an input/output (I/O) request queue, and an outgoing network queue.

Further to the illustrative example mentioned above, a persistency implementation can support storing data in a series of pages (page list) and the ability to add these page lists to other persistent structures (e.g., key/value hash table) to make them reachable from this structure. A snapshot of this persistency guarantees that all reachable page lists will survive a restart of the system, while any unreachable page lists (e.g., held by transient structures) will disappear and the space can be reused for something else. Conceptually, each page list can be modeled as a file in the filesystem (e.g. with Unix-like semantics), which initially is created in some temporary directory with a temporary name. When the file (e.g. a value attached to a key) is finalized, it is attached to a directory (e.g. a K/V store table) and given a name (key of the value). In the event of a system crash and restart, the temporary directory is purged. While the specific of the persistency implementation used in a given system is beyond the scope of this disclosure, in one example, persistency functions consistent with the current subject matter may be achieved using a Unix filesystem.

During processing of a request, additional memory may be needed to hold "in-flight" information of (e.g. relating to) the request. Normally, this additional memory would grow as further data are received for the request. Use of constant-size memory, consistent with implementations of the current subject matter can be used to guarantee request processing and fairness to other requests. In other words, a fixed-size number of slots for concurrent request processing can be defined, in a manner that can be thought of as analogous to fixed-size network queues.

To this point, the above descriptions have related only to a simple K/V store PUT request, which contains a key and data (i.e., PUT(key, value_size, value)). Additional request types can be defined to assist in processing requests in constant memory. These are PUT(key, value_size, value_id) and PUT_PART(value_id, offset, size, part_data)

When a client machine needs to send a large value, it can first send a series of small PUT_PART messages which represent the actual value to store. Then, the client machine can send a PUT request indicating which value ID it had used. In this manner, each request (i.e. each data part) is small enough to fit within a specified fixed-size buffer. This feature can be exploited further as described in more detail below.

The server can respond to a PUT_PART request by moving the (small) data from the PUT_PART request into an I/O request to write it at the respective offset in a (not yet connected) page list corresponding to the combination of client ID and value ID (the client ID can be used to disambiguate a same value ID across several clients, since each client may have its own value ID space). When the final PUT request arrives, the server connects the page list with the value filled with preceding PUT_PART requests to the key specified in the PUT request (e.g., by writing a page list ID for the page list to a persistent hash table in a slot for the specified key). For simplicity of explanation of this example, it can be assumed that processing the PUT request to connect the temporary page list with a value to its key is also realized as an I/O operation.

A process consistent with implementations of the current subject matter can include creation of a data flow machine, which can self-regulate itself without the need for additional memory allocation. This self-regulating can be achieved by use of fixed-size memory containing request slots, which are managed in a series of inter-communicating queues. When a request needs to be processed, slots for tasks necessary to perform the processing are assigned from the queues in turn. During the processing the slot is unavailable for other tasks. When processing of a given task is completed, the assigned slot is then freed back to its respective queue for processing of a task required for handling a new request.

Figure 2:
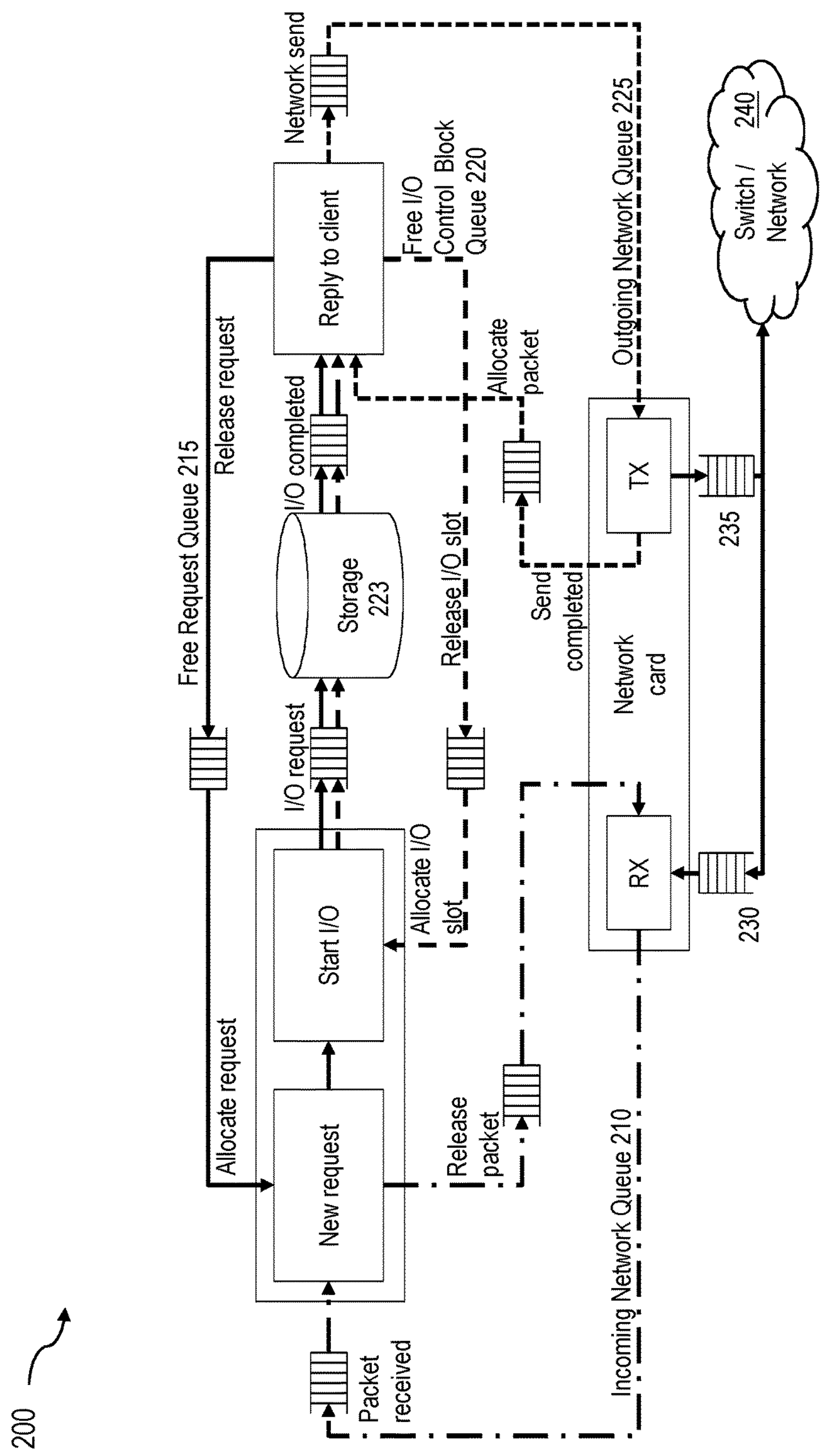
FIG. 2 shows a data flow diagram consistent with implementations of the current subject matter.

FIG. 2 shows a diagram illustrating an example of such a data flow machine 200, which includes a receive path (also referred to as an incoming network queue) 210, a free request queue 215, a free I/O control block queue 220 (in which I/O requests are allocated, processed by writing to a storage 223 and then returned back to a pool of available I/O slots), a network send path 225 for sending replies to the client (also referred to as an outgoing network queue 225), and external traffic to 230 and from 235 the network 240.

Each of the incoming network queue 210, the free request queue 215, the free I/O control block queue 220, and the outgoing network queue 225 have assigned slots of a fixed size, and the number of assigned slots in each queue is advantageously the same. A request is processed by allocating a free receive slot of the incoming network queue 210 to handle a first packet of the request. Further processing of the first packet is handled by assigning a free request slot of the free request queue 215 and a free I/O control block slot of the free I/O control block queue 220. The respective assignments of the free request slot from the free request queue 215 and the free I/O control block slot from free I/O control block queue 220 become possible when a free request slot and an I/O control block slot become available (e.g. by completion of the previous task to which the free request slot and I/O control block slot had been assigned). Outgoing network traffic is likewise assigned to a free send slot of the outgoing network queue 225 when the send slot becomes available (e.g. by completion of a previous send task to which the send slot had been assigned).

When there is no space in the incoming network queue 210 (i.e. there are no available receive slots), the network card hardware 245 can use back-pressure to slow down senders, which can optionally include preventing new requests from being received until a free receive slot is available in the incoming network queue 210. When a new request comes in via the incoming network queue 210, a free receive slot is assigned. If no receive slot is free, incoming processing stalls until a receive slot becomes available, potentially causing back-pressure in the incoming network queue 210.

Similarly, the assigned receive slot must hand off to a free request slot in the free request queue 215 and to a free I/O control block slot in the free I/O control block queue 220. If there is no space in the free request queue 215 (e.g. no free request slot) and the free I/O control block queue 220 (e.g. no free I/O control block slot), back pressure can cause processing in the incoming network queue 210 to stall until a free request slot becomes available in the free request queue 215 and a free I/O control block becomes available in the free I/O control block queue 220. Since each request can normally result at most in one I/O request, if the incoming network queue 210 is allocated a same number of receive slots as the free request queue 215 has request slots and the free I/O control block queue 220 has I/O control block slots, this can guarantee that there is ultimately an I/O control block slot in the free I/O control block queue 220 available. When the I/O processing finishes, the request processing is done and a response is sent to the client machine via the outgoing network queue 225. If this outgoing network queue 225 is full (i.e. there is no available send slot), processing stalls until a send slot is free (potentially resulting in further stalling of the I/O queue 220, the free request queue 215, and/or the incoming network queue 210).

The boxes in FIG. 2 indicate processing steps, which can run in parallel or interleaved. Each processing step can only continue processing when all necessary inputs are available. For example, new request processing is blocked until a new request arrives and a request object (e.g. a processing slot) can be allocated from the pool of free requests. A client reply is blocked until I/O is completed and a packet buffer to send the reply (e.g. in the outgoing network queue 225) can be allocated.

In this manner, fairness is guaranteed, since large requests are simply decomposed to small requests and thus all clients are competing for network and server resources on an equal basis.

In practice, assuming that modern SSD drives or the like are used in the system, such drives generally have higher throughput than network interfaces. Thus, stalls are likely to be greatly minimized. Based on the SSD characteristics, it is possible to compute a required number of slots in individual queues to handle a full network load. In other words, if the SSD drive has higher throughput than the network interface and it has 1 ms 99 percentile latency, then it can be necessary to buffer at least around 1 ms worth of requests to complete at least 99% of requests without stalls. At an approximately 1 KB average size per request and 10 Gbit/s Ethernet, this would translate to about 1000 slots in each queue, which corresponds to only a few MB worth of buffers for the node as a whole (i.e., not per connection or per requests).

With regards to reading data from a K/V store, the client sends a GET(key) request and it receives a complete value back. A GET response type can be defined as a GET_PART_RESPONSE(offset, total_size, part_size, part_data). When the server receives the GET(key) request, it will find an appropriate page list using the hash table and trigger a read I/O to read the first part of the value from the page list. When this I/O is done, it will send the part over the network outgoing queue 225. This sending may stall if there is no space in the queue. Instead of terminating the processing, however, the server will simply schedule an I/O request for the next part (if needed, possibly causing back-pressure on I/O requests and then further up the stack up to incoming network queue). The process repeats until the entire value is sent. Again, fairness is guaranteed, since any other incoming requests will be processed round-robin with a large GET request, so the large request cannot stall the processing.

The state machine can be extended appropriately to also handle data replication to other nodes, e.g., in a consensus protocol. Doing so can add analogous steps parallel to the I/O workflow sending data to remote nodes via the outgoing network queue and waiting for confirmation on the incoming network queue (possibly using separate network queues to prevent possible deadlocks due to recursive blocking situations between nodes in the system).

An approach having one or more features as desired herein may be implemented for request processing for a platform for replicated, highly-available data stores, such as a key/value store. In other implementations one or more (or all) features can be used for other data stores as well. For replication, an additional processing queue can be added for communication between individual replicas (e.g. between computing nodes). In other words, a set of processing slots can be assigned for handling of network packets between nodes, and the number of these network packets can be set equal to the number of slots for the incepting network queue 210 of the nodes.

Figure 3:
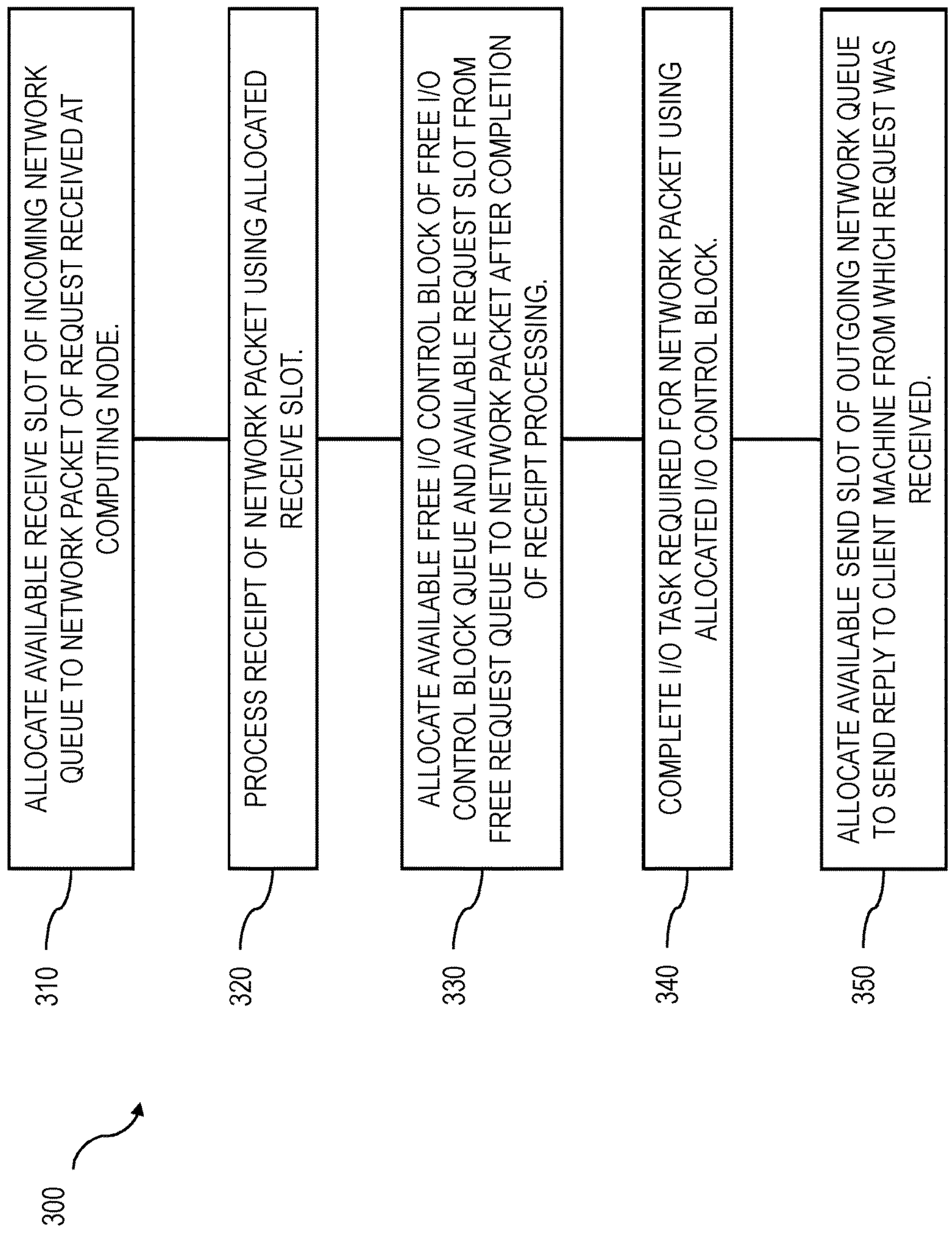
FIG. 3 shows a process flow diagram illustrating aspects of a method having one or more features consistent with implementations of a first aspect of the current subject matter.

FIG. 3 shows a process flow chart 300 illustrating features that can be included in a method consistent with implementations of the current subject matter. At 310, an available receive slot of an incoming network queue is allocated to a network packet of a request received at a computing node. Receipt of the network packet is processed at 320 using the allocated receive slot.

An available free I/O control block of a free I/O control block queue and an available request slot from a free request queue are allocated to the network packet at 330 after completion of the receipt processing. The free I/O control block queue and free request queue respectively have a same number of I/O queue blocks and request slots as the incoming network queue has receive slots. An I/O task can be initiated using the allocated I/O control block, and the allocated receive slot can be released for use by another received request. The releasing allocated receive slot can occur after the completing of the I/O task.

An I/O task required for the network packet is completed at 340 using the allocated I/O control block, and an available send slot of an outgoing network queue is allocated at 350 to allow sending of a reply to a client machine from which the request was received. The reply can be sent to the client via the outgoing network queue.

In some implementations of the current subject matter receipt of new requests via network hardware of the computing node can be slowed, the slowing occurring when there are no available receive slots in the incoming network queue via application of back-pressure. The slowing can include blocking a new request from being processed until a receive slot in the incoming network queue becomes free. Processing of new requests via the incoming network queue can also or alternatively be slowed via application of back-pressure when there are no available I/O queue blocks in the free I/O control block queue and/or no available request slots in the free request queue.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

allocating an available receive slot of an incoming network queue to a network packet of a request received at a computing node, the computing node forming part of a distributed computing system implementing a distributed data storage application, wherein the distributed computing system implements a consensus protocol to ensure that replicas of a state machine of the distributed data storage application are kept in a consistent state based on a consensus among computing nodes forming the distributed computing system;

processing receipt of the network packet using the allocated receive slot;

allocating an available free I/O control block of a free I/O control block queue and an available request slot from a free request queue to the network packet after completion of the receipt processing, the free I/O control block queue and free request queue respectively having a same number of I/O queue blocks and request slots as the incoming network queue has receive slots;

completing an I/O task required for the network packet using the allocated I/O control block;

processing the network packet using the free request queue;

assigning a set of processing slots within an additional processing queue for processing of transmission of network packets between the computing nodes of the distributed computing system and for replication of the finite state machine to implement the consensus protocol, the number of slots in the set of slots equal to a number of slots of the incoming network queue, the additional processing queue separate from the incoming network queue; and allocating an available send slot of an outgoing network queue to send a reply to a client machine from which the request was received.

2. A computer-implemented method as in claim 1, further comprising initiating an I/O task using the allocated I/O control block and releasing the allocated receive slot for use by another received request.

3. A computer-implemented method as in claim 2, wherein the releasing occurs after the completing of the I/O task.

4. A computer-implemented method as in claim 1, further comprising sending the reply to the client via the outgoing network queue.

5. A computer-implemented method as in claim 1, further comprising slowing, via application of back-pressure, receipt of new requests via network hardware of the computing node, the slowing occurring when there are no available receive slots in the incoming network queue.

6. A computer-implemented method as in claim 5, wherein the slowing comprises blocking a new request from being processed until a receive slot in the incoming network queue becomes free.

7. A computer-implemented method as in claim 1, further comprising slowing, via application of back-pressure, processing of new requests via the incoming network queue, the slowing occurring when there are no available I/O queue blocks in the free I/O control block queue and/or no available request slots in the free request queue.

8. A computer program product comprising a non-transitory machine-readable medium storing instructions that, when executed by at least one programmable processor, cause the at least one programmable processor to perform operations comprising:

allocating an available receive slot of an incoming network queue to a network packet of a request received at a computing node, the computing node forming part of a distributed computing system implementing a distributed data storage application, wherein the distributed computing system implements a consensus protocol to ensure that replicas of a state machine of the distributed data storage application are kept in a consistent state based on a consensus among computing nodes forming the distributed computing system;

processing receipt of the network packet using the allocated receive slot;

allocating an available free I/O control block of a free I/O control block queue and an available request slot from a free request queue to the network packet after completion of the receipt processing, the free I/O control block queue and free request queue respectively having a same number of I/O queue blocks and request slots as the incoming network queue has receive slots;

completing an I/O task required for the network packet using the allocated I/O control block;

processing the network packet using the free request queue;

assigning a set of processing slots within an additional processing queue for processing of transmission of network packets between the computing nodes of the distributed computing system and for replication of the finite state machine to implement the consensus protocol, the number of slots in the set of slots equal to a number of slots of the incoming network queue, the additional processing queue separate from the incoming network queue; and allocating an available send slot of an outgoing network queue to send a reply to a client machine from which the request was received.

9. A computer program product as in claim 8, wherein the operations further comprise initiating an I/O task using the allocated I/O control block and releasing the allocated receive slot for use by another received request.

10. A computer program product as in claim 9, wherein the releasing occurs after the completing of the I/O task.

11. A computer program product as in claim 8, wherein the operations further comprise sending the reply to the client via the outgoing network queue.

12. A computer program product as in claim 8, wherein the operations further comprise slowing, via application of back-pressure, receipt of new requests via network hardware of the computing node, the slowing occurring when there are no available receive slots in the incoming network queue.

13. A computer program product as in claim 12, wherein the slowing comprises blocking a new request from being processed until a receive slot in the incoming network queue becomes free.

14. A computer program product as in claim 8, wherein the operations further comprise slowing, via application of back-pressure, processing of new requests via the incoming network queue, the slowing occurring when there are no available I/O queue blocks in the free I/O control block queue and/or no available request slots in the free request queue.

15. A system comprising computer hardware configured to perform operations comprising:

allocating an available receive slot of an incoming network queue to a network packet of a request received at a computing node, the computing node forming part of a distributed computing system implementing a distributed data storage application, wherein the distributed computing system implements a consensus protocol to ensure that replicas of a state machine of the distributed data storage application are kept in a consistent state based on a consensus among computing nodes forming the distributed computing system;

processing receipt of the network packet using the allocated receive slot;

allocating an available free I/O control block of a free I/O control block queue and an available request slot from a free request queue to the network packet after completion of the receipt processing, the free I/O control block queue and free request queue respectively having a same number of I/O queue blocks and request slots as the incoming network queue has receive slots;

completing an I/O task required for the network packet using the allocated I/O control block;

processing the network packet using the free request queue;

assigning a set of processing slots within an additional processing queue for processing of transmission of network packets between the computing nodes of the distributed computing system and for replication of the finite state machine to implement the consensus protocol, the number of slots in the set of slots equal to a number of slots of the incoming network queue, the additional processing queue separate from the incoming network queue; and allocating an available send slot of an outgoing network queue to send a reply to a client machine from which the request was received.

16. A system as in claim 15, wherein the operations further comprise initiating an I/O task using the allocated I/O control block and releasing the allocated receive slot for use by another received request.

17. A system as in claim 16, wherein the releasing occurs after the completing of the I/O task.

18. A system as in claim 15, wherein the operations further comprise sending the reply to the client via the outgoing network queue.

19. A system as in claim 15, wherein the operations further comprise slowing, via application of back-pressure, receipt of new requests via network hardware of the computing node, the slowing occurring when there are no available receive slots in the incoming network queue, the slowing comprising blocking a new request from being processed until a receive slot in the incoming network queue becomes free.

20. A system as in claim 15, wherein the operations further comprise slowing, via application of back-pressure, processing of new requests via the incoming network queue, the slowing occurring when there are no available I/O queue blocks in the free I/O control block queue and/or no available request slots in the free request queue.

21. A system as in claim 15, wherein each of the incoming network queue, the free I/O control block queue, the free request queue, and outgoing network queue form a predefined memory pool including a preallocated number of memory blocks.

22. A system as in claim 15, wherein each of the incoming network queue, the free I/O control block queue, the free request queue, and outgoing network queue include fixed sized memory including request slots.

23. A system as in claim 15, wherein memory allocation for handling of the processing of the network packet is non-dynamic.

24. A system as in claim 15, wherein allocating the available free I/O control block of the free I/O control block queue and the available request slot from the free request queue to the network packet is performed in response to completion of the receipt processing.

25. A system as in claim 15, wherein the distributed database application includes a key value store, the request includes a PUT request or a GET request.

* * * * *